United States Patent
Bock

(10) Patent No.: US 8,064,545 B2
(45) Date of Patent: Nov. 22, 2011

(54) DEVICE AND METHOD FOR DETERMINING A CONSTELLATION OF A QUADRATURE AMPLITUDE MODULATED SIGNAL

(75) Inventor: Christian Bock, Freiburg (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 930 days.

(21) Appl. No.: 12/009,135

(22) Filed: Jan. 16, 2008

(65) Prior Publication Data

US 2008/0225973 A1 Sep. 18, 2008

(30) Foreign Application Priority Data

Jan. 16, 2007 (DE) .................. 10 2007 003 105

(51) Int. Cl.
*H03D 3/22* (2006.01)
(52) U.S. Cl. ..................... 375/332; 375/329
(58) Field of Classification Search ............ 375/324, 375/316, 329–332
See application file for complete search history.

(56) References Cited

U.S. PATENT DOCUMENTS

| | | | | |
|---|---|---|---|---|
| 5,640,417 A | * | 6/1997 | Barabash et al. | 375/222 |
| 6,236,687 B1 | * | 5/2001 | Caso et al. | 375/327 |
| 7,274,748 B1 | * | 9/2007 | Khlat | 375/296 |
| 2002/0193085 A1 | * | 12/2002 | Mathe et al. | 455/126 |
| 2004/0131125 A1 | * | 7/2004 | Sanderford et al. | 375/261 |
| 2004/0208259 A1 | * | 10/2004 | Hunton | 375/296 |
| 2005/0249314 A1 | | 11/2005 | Bock | |

FOREIGN PATENT DOCUMENTS

| | | |
|---|---|---|
| DE | 3834377 | 4/1990 |
| DE | 10344756 A1 | 5/2005 |
| EP | 0 639 915 B1 | 2/1995 |

OTHER PUBLICATIONS

Nagy, P.A.J. "A Modulation Classifier for Multi-Channel Systems and Multi-Transmitter Situations." *IEEE*, 1994. pp. 816-820.
Volder, Jack E. "The CORDIC Trigonometric Computing Technique." *IRE Transactions on Electronic Computers.* vol. EC-8, No. 3, 1959. pp. 330-334.
Young Bok Kim, Yong-Bin Kim. "A Low Power CMOS Cordic Processor Design for Wireless Telecommunication." *IEEE Midwest Symposium on Circuit and Systems(with NEWCAS)*. Montreal, Canada. Aug. 5-8, 2007. pp. 1336-1339.
Wood S. et al: "Modem constellation identification: a performance comparison of two methods" 19900403-11900406; Apr. 3, 1990; pp. 1651-1654; XP010641655.

* cited by examiner

*Primary Examiner* — Emmanuel Bayard
(74) *Attorney, Agent, or Firm* — DLA Piper LLP (US)

(57) ABSTRACT

The invention relates to a method and/or a device for determining a constellation from a plurality of possible constellations with a constellation identification device which is used to determine the constellation of the signal from a plurality of possible constellations. This is advantageously achieved when a converter is arranged to convert the signal into polar coordinates provided with a radial component, and to provide a radius as a radial component of the signal, wherein the constellation identification device is constructed so as to determine the constellation of the signal from the radius.

15 Claims, 2 Drawing Sheets

DEVICE AND METHOD FOR DETERMINING A CONSTELLATION OF A QUADRATURE AMPLITUDE MODULATED SIGNAL

PRIORITY CLAIMS/RELATED APPLICATIONS

This applications claims priority under 35 USC 119(a)-(d) to German Patent Application No. 10 2007 003 105.1 filed on Jan. 16, 2007 entitled "VORRICHTUNG UND VERFAHREN ZUM BESTIMMEN EINER KONSTELLATION EINES QUADRATUR-AMPLITUDEN-MODULIERTEN SIGNALS", the entirety of which is incorporated herein by reference.

The invention relates to a device for determining a constellation of a quadrature amplitude modulated signal from a plurality of thereof and to a corresponding method for the determination of a constellation.

EP 0 639 915 describes a device and a method for determining the constellation size of a quadrature amplitude modulated signal, wherein the signal contains a size selected from a plurality of constellation sizes. A constellation identification device is used in order to determine the constellation, which is constructed so as to determine the distribution of the output of a normalized quadrature amplitude modulated signal and, in this manner, to analyze and determine the QAM alphabet (QAM: Quadrature Amplitude Modulation) and/or the constellation that is used. The constellation identification device comprises a means for squaring of a size of the QAM signal that is used as the quadrature amplitude modulated input signal so as to generate a QAM signal with a squared size. Moreover, it also includes a means, which is connected with the squaring means, and which is used to analyze the probability density function of the QAM signal by analyzing the size-squared QAM signal in order to determine the size of the constellation or the constellation of directly received QAM signal. Moreover, also included is a means, connected to the analyzing means, which is employed to determine the duration of the time period during which the analyzing means analyzes the QAM signal. The means that are connected to the analyzing means and to the duration determining means serve to generate a signal, which is characteristic of the constellation size of the directly received QAM signal. Based on the size-squared QAM signal, the constellation is then determined with further steps and components according to the method, in particular by using several counters based on the received or input signal.

Figure 2:
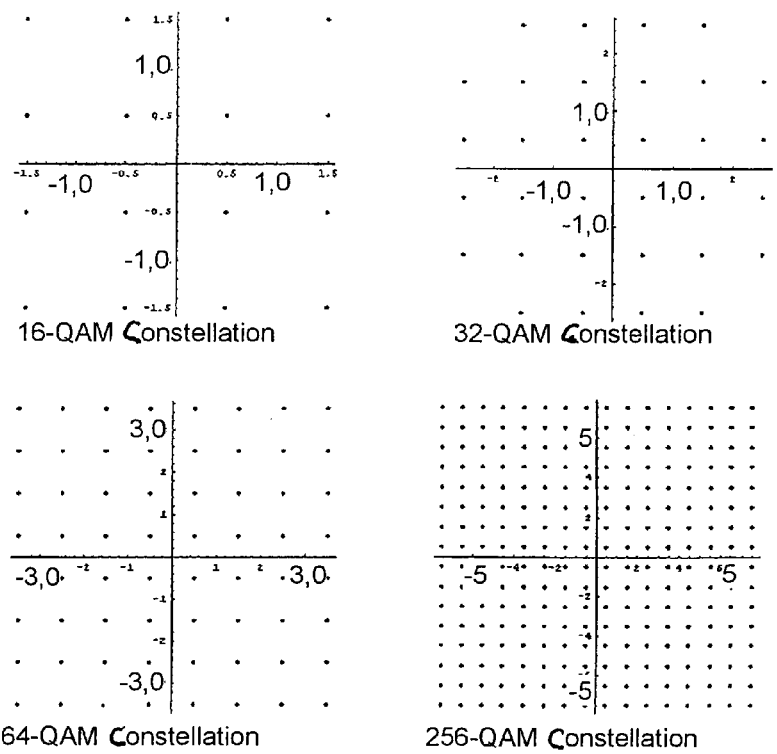

A final element that is taken into consideration is that all constellations, as depicted in FIG. 2, in each case have an evaluation value for the output or for median output, and for the amplitude or median amplitude. With the squaring of the I-components and Q-components, the quadrature amplitude modulated signal determines each output of the received and sampled signal so as to make it possible to consequently come to a conclusion by means of a comparison with the expected value of various possible constellation about the constellation on which the signal is based.

A disadvantage in this case is the overhead that is required for calculation with the squaring of the I-components and Q-components of the quadrature amplitude modulated signal in order to determine the output $p=(x^2+y^2)$ of the signal.

Various arrangements and methods for transmitting digital signals with quadrature amplitude modulation are also known, typically involving receiver concepts including complex downward mixing in the base band, as well as amplitude, carrier frequency/carrier phase and sampling control.

From DE 103 44 756 A1 is also known a method or a circuit arrangement for the determination of a symbol upon reception of a signal coupled with a quadrature signal pair. In such a case, the determination is made based on an analysis of the distance of at least one reception point to at least one nominal point in a complex coordinate space. At the same time, the distance in non-Cartesian or not exclusively Cartesian complex coordinate space is analyzed and a decision is made on the basis of this analysis. For this purpose, the Cartesian coordinate space or the coordinate space in the received digital signal is transformed into a polar coordinate space and an analysis of the distances is carried out in the polar coordinate space. Finally, a back transformation is carried out in Cartesian space to make it possible to provide a determined symbol in Cartesian space at one input of a corresponding circuit arrangement.

By way of an example, such an arrangement consists of a succession of individual components of a known QAM receiver providing mixing in the base band, wherein according to the sequence, after the mixing in the base band, automatic amplification control is performed, which is followed by sampling and filtering in a Nyquist filter and in an equalizer, and by a conversion of the coordinates performed in a CORDIC. The sequence of a plurality of these processing steps, and/or also other processing steps, can be carried out, in this case, in an optimal manner by the CORDIC, optionally also according to other sequences, or it can be also omitted.

The task of the invention is to provide a device and a method which makes it possible to arrive at a simple determination of a constellation of a quadrature amplitude modulated signal from a plurality of possible constellations with a small processing overhead and with a small construction overhead. Advantage is in this case preferably taken of already existing components available in the circuit arrangement, so that as few components or processing steps having the simplest possible design are required for the actual determination of the constellation.

This task is achieved by a device for the determination of a constellation of a quadrature amplitude modulated signal from a plurality of possible constellation having the characteristics described in claim 1 of the patent and/or by a method having the characteristics described in patent claim 6. Advantageous embodiments are the subject of dependant claims.

Preferred is therefore a device for the determination of a constellation of a quadrature amplitude modulated signal from a plurality of possible constellations, wherein this device is equipped with a constellation identification device for the determination of the constellation and with a converter, which is deployed in the device so as to convert the signal into polar coordinates and to provide a radius as a radial component of the signal; wherein the constellation identification device is constructed so as to determine the constellation alphabet of the signal from the distribution of the radii of the sample signal.

In other words, a determination is made about the constellation of the signal using only a single component of the quadrature amplitude modulate signal which has complex values. The term constellation should be in this case understood in particular as the size of the constellation, which is to say whether the quadrature amplitude modulated signal is based for example on a 16 QAM constellation, a 32 QAM constellation, or a 64 QAM constellation. Under the term a device for the determination of a constellation should be in particular understood a circuit arrangement which comprises a plurality of individual circuit components for signal processing operations, which per se are already known. It should be understood that the phrase plurality of possible constellations refers to constellations used for processing of quadrature amplitude modulated signals according to the quadrature amplitude modulations that are usually employed. These are, in particular, 16 QAM, 32 QAM, 64 QAM 256 QAM, wherein, however, each can be in principle also used for lower or higher values of QAM constellations and/or QPSK.

In accordance with the method, preferred is a method for the determination of a constellation of a quadrature amplitude modulated signal from a plurality of possible constellations, wherein the signal is converted from a Cartesian coordinate space into a polar coordinate space, in particular a space provided with a radial component, and a radius provided in the form of a radial component of the signal, and wherein the constellation of the signal is determined from the distribution of the radii.

With a similar device, the converter is preferably constructed as a CORDIC which enables a simple conversion of the quadrature amplitude modulated signal with a small overhead, and/or of its I-components and Q-components in the complex value space with polar coordinates, that is to say with one radius and one phase. According to the method, the conversion is thus preferably performed with a CORDIC. Other methods, for instance using a table, are also possible.

It is advantageous when the radius for the input to the constellation identification device is tapped off from the discriminator input, so that the radius is read and furnished to the constellation identification device before being supplied to the discriminator. It is also preferable when an output of the constellation identification device is input to the discriminator in order to input constellation information that is determined by means of a constellation identification device to be considered during the determination of a symbol. A similar arrangement makes it possible to carry out a symbol determination with a correct constellation in the discriminator, which can be achieved in the discriminator preferably with only a small time difference or chronological offset, in particular through the intermediary of a connected delay element, when the radius is supplied to the discriminator.

Preferred is a device or a circuit arrangement equipped with an amplification control unit used to control the quadrature amplitude modulation signal and/or preprocessed signal on one median radius value. When all amplification controls, in particular fully automated controls, normalize all possible input signals on a median radius, various constellations can be distinguished easily and in a simple manner through different distributions on the radius axis during the application of the values of the radii to the radius axis.

It can be in this case advantageous when the distribution patterns of the possible constellations are determined using a similar radius axis. In addition, or preferably alternatively, the constellation can be determined based on a correlation with a correlation pattern of the possible constellations.

It can be advantageous when the evaluation and/or determination of the constellation is determined with the count of bin populations and/or certain or predetermined amplitude regions relative to the other amplitude regions.

One application of such a method or conversion of such device can be realized in combination with a complex digital modulation method such as QAM. A similar method or devices are used mostly with new radio, television and data services via cable and partially also in combination with terrestrial transmissions. Essentially, such a conversion can be realized in particular in combination with per se known circuit arrangements and methods, wherein the quadrature amplitude modulated signal is transformed or converted for further evaluation, in particular for the determination of a symbol in a space with a radius component. With similar circuit arrangements and/or devices, it is sufficient when a constellation identification device is added which has a simple construction. As an option, a corresponding evaluation in this respect can be realized with suitable equipment and/or with programmed processors. In this respect, the sequence and the equipment of other components processing the quadrature amplitude modulated signal can include also a great number of various types of per se known embodiments, as well as embodiments of future devices.

Figure 1:
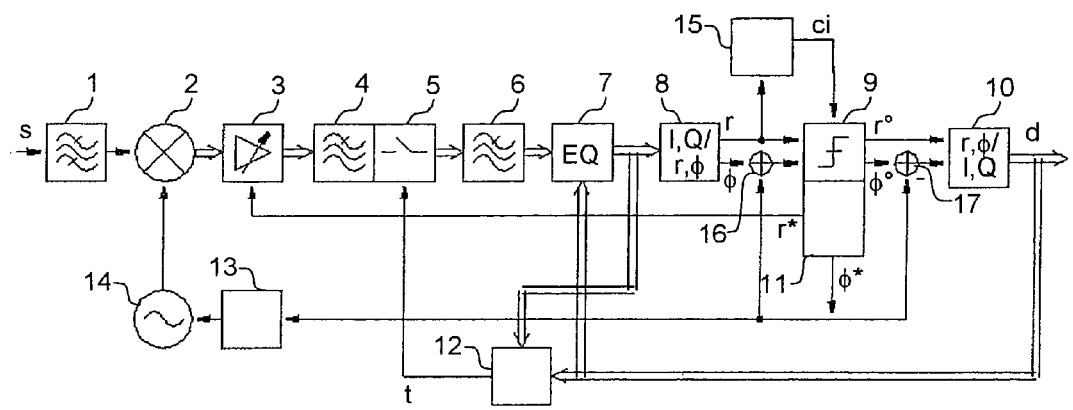
Figure 3:
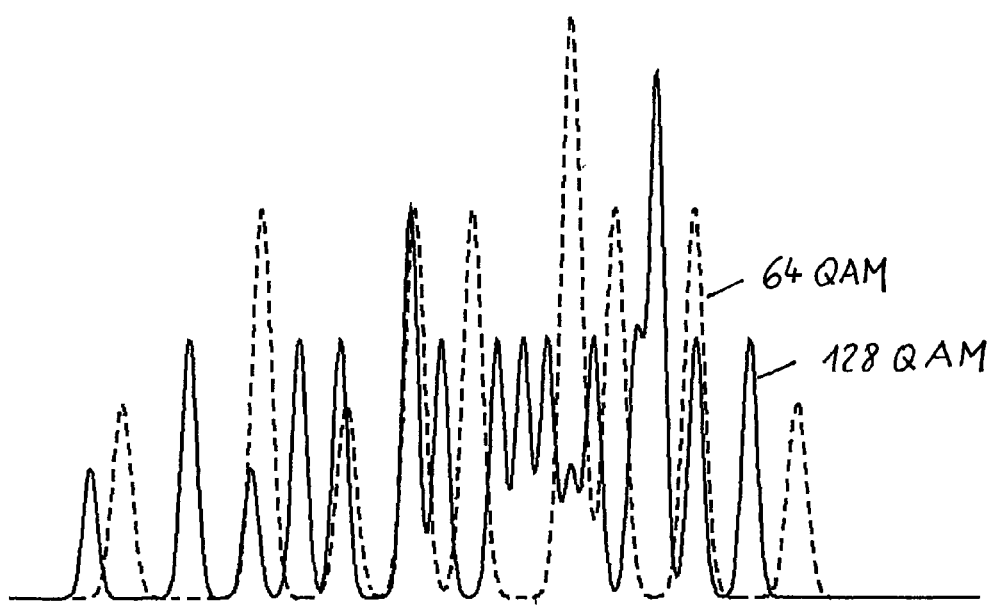
Figure 4:
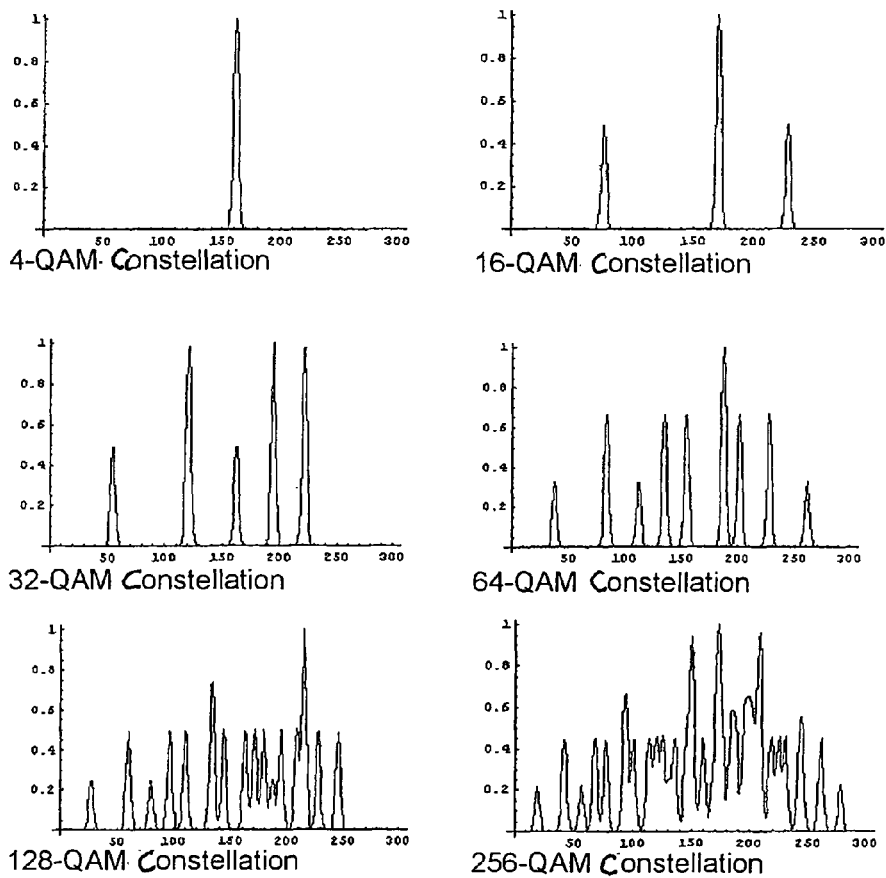

An embodiment of the invention will now be explained in more detail by way of an example based on the attached figures, which show the following:

FIG. 1 a circuit arrangement provided merely as an example of a circuit arrangement for processing of a quadrature amplitude modulated signal, which comprises among other elements a constellation identification device, FIG. 2 four exemplary QAM constellations in the complex I/Q level represented by Cartesian coordinates, FIG. 3 normalized distributions of radii which are mutually superimposed for QPSK, 16 QAM, 32 QAM, 64 QAM, 128 QAM and 256 QAM and FIG. 4 distributions of radii for the individual amplitude modulations corresponding to the superimposed distributions of their radii illustrated in FIG. 3.

FIG. 1 shows only an exemplary arrangement of the components of a device for processing of a quadrature modulated signal s. The signal s is in this case input as a digital or digitalized signal s to band-pass filtering. The band-pass filtered signal of the band-pass filter 1 is input to a mixer 2, which outputs a complex valued signal in the Cartesian coordinate space with an I-component or a Q component in a manner that is per se known. The signal that is output from the mixer 2 is input to an amplification control device 3, which generates an output signal depending on an input control signal, which is then input to a low-pass filter 4. A band-restricted signal is input with the low-pass filter to a sampling device 5, to which is also input a clock signal t as a sampling signal. The signal that is output from the sampling device 5 is input to another low-pass filter 6 whose output signal is input to an equalizer EQ 7.

The output signal of the equalizer 7 is input to a converter 8, which is designed for conversion of the signal from the Cartesian space I, Q in a coordinate space having at least one radial component. The converter 8 is preferably a CORDIC, or the conversion is performed with a CORDIC algorithm (Coordinate Digital Computer). Consequently, the converter 8 outputs the signal in polar coordinates as a radius r and a phase $\Phi$.

The radius r is input directly to a discriminator 9. The phase is input to an adder whose output value is input to the discriminator 9. The discriminator 9 serves as a symbol discriminator for discrimination of symbols of the signal s that was input to the circuit arrangement. Accordingly, a radius $r°$ and a phase $\Phi°$ are output from a symbol discriminated or determined in this manner. The phase $\Phi°$ of the determined symbol is input to another adder 17, whose addition result or subtraction result is input to a second converter 10. To the second converter is also input a radius $r°$ of the determined symbol. The second converter 10, which is preferably also constructed as a CORDIC, is used to convert the polar coordinates into Cartesian coordinates and to provide the determined symbol d at one output.

According to the exemplary arrangement of the components shown in the illustration, an amplitude/phase control device is allocated to the discriminator 9, which outputs in a manner that is per se known as control values a radial control value $r*$ and a phase control value $\Phi*$. The radial control value $r*$ is in the embodiment illustrated in the figure input to the amplification control device 3 in order to control an amplitude of the input signal. The phase control value Φ* is input as another addition value to the first adder 16 and additionally also to a frequency control device 13. Moreover, the phase control value Φ* is also input to the second adder 17 for subtraction, that is to say for counter-rotation with the angle subtraction.

The frequency control device determines a control signal which is input to an oscillator 14. The output signal of the oscillator 14, which is controlled in this manner, is input to the mixer 2 for mixing with the input signal, that is to say for example with the band-pass filtered signal s. As another control value, the signal which is output from the equalizer 7 is input to a clock control device 12 which supplies the clock signal t as a clock to the sampling device 5. The determined symbol d is input as another control value to the clock control device 12. The determined symbol, or a corresponding series of determined signals d observed over a period of time, is also input as a control or a regulating value to the equalizer 7.

The components and processing steps described above can be modified in a customary manner; in particular, they can be mutually interchanged or complemented by other well-known components and processing steps. Optionally, individual components and processing steps described above can be also omitted or replaced by another type of components or processing steps, which are well-known as being applied to the processing of quadrature amplitude modulated signal.

In order to determine a suitable constellation based on the signal s of the constellation from a plurality of possible constellations, the arrangement is equipped with a constellation identification device 15. The radius r, which is output from the first converter 8, is also input to the constellation identification device 15. The radius r is in this case preferably read with a tap deployed in front of the discriminator 9, and input to the constellation identification device 15. The constellation identification device 15 is constructed and/or controlled so as to determine the constellation information ci, which corresponds to the constellation alphabet, that is based on the signal s. In this case, it should be understood that the phrase constellation also means a so-called constellation size.

In the depicted embodiment, the constellation information ci is input to the discriminator 9, so that the discriminator knows the information on which the signal is based during the determination process and therefore can search for the corresponding signal constellation information while the symbols to be determined are being targeted.

While the exemplary arrangement is equipped with a discriminator 9 to which a corrected phase value Φ* is input so that processing of polar coordinates is conducted, this can be also replaced by other types of circuit arrangements and/or processing types based on this type of a constellation determination. For instance, a determination can be theoretically carried out even in Cartesian coordinate space, when for example the quadrature amplitude modulated signal s is determined by means of a conversion of coordinates performed to determine the radius r in a branched processing path so as to provide the radius r for a corresponding processing used for the identification of the constellation. In such case, counter-rotation, in particular counter-rotation performed via angle subtraction, and a second CORDIC, or the use of a table in order to generate the determined signal could optionally be completely eliminated.

Many types of modifications in various manners are also possible. For example, the sampling can be performed also prior to the mixing, which can be done in the case of a non-synchronous symbol sampling also with another sampling in the digital domain.

Finally, the determining concept here is the basic concept that a radius signal is determined in the form of the radius r and supplied to a constellation identification unit which analyzes the distribution of the radii.

FIG. 3 shows an example of distributions of various radii on the radius axis, wherein the input signals are normalized by the automatic amplification control 3 on a median radius. The various possible constellations are easily distinguishable by the different distributions on the radius axis.

The evaluation of the constellation identification device 15, carried out according to a suitable evaluation process, can be performed with a correlation to a known pattern, or by counting the population in the bins, i.e. by taking into account determined or predetermined amplitude regions which are compared to other regions. To illustrate the distinct differences between the types of the amplitude normalized distributions of the radii on the radii, six individual, mutually different constellations are depicted by way of an example in FIG. 4.

The invention claimed is:

1. A device for determining a constellation from a plurality of possible constellations, comprising:
   a constellation identification device for determining the constellation of the signal (s) from a plurality of possible constellations,
   a converter configured to convert the signal (s) into coordinates with a radial component, and to provide a radius (r) as the radial component of the signals, and
   wherein the constellation identification device is constructed so as to determine the constellations (16 QAM; 32 QAM; . . . ) from the radius (r) of the signal (s).

2. The device according to claim 1, wherein the converter is constructed as a CORDIC.

3. The device according to claim 1 further comprising a discriminator and wherein a first input of the discriminator that receives the radius is coupled to the constellation identification device.

4. The device according to claim 3, wherein an output of the constellation identification device coupled to the discriminator in order to input constellation information that is to be taken into account during the determination of a symbol.

5. The device according to claim 1, further comprising an amplification control device used to regulate the signal at a median radius value.

6. A method for determining a constellation of a quadrature amplitude modulated signal (s) from a plurality of possible constellations, comprising:
   converting, using a converter, the signal from a Cartesian coordinate space into polar coordinates (e, Φ) which includes a radial component representative of a radius (r) as the radial component of the signal (s), and
   determining, using a constellation identification device, the constellation of the signal from the radius (r).

7. The method according to claim 6, wherein a CORDIC is used for conversion.

8. The method according to claim 6, wherein the radius is read prior to being supplied to a discriminator and furnished for determining the constellation.

9. The method according to claim 8, wherein determining the constellation includes generating constellation information, and further comprising using the constellation information for determining a symbol.

10. The method according to claim 6, further comprising normalizing the signal to a median radius value.

11. The method according to claim 6, wherein determining the constellation is based various radial distributions of the possible constellations.

12. The method according to claim 11, wherein the constellation is determined using a correlation to correlation patterns of a set of possible correlations.

13. The method according to claim 11, wherein the constellation is determined with the count of the bin populations of predetermined amplitude regions relative to other amplitude regions.

14. The device according claim 1 wherein the plurality of possible constellations includes QPSK, 16 QAM, 32 QAM, 128 QAM or 512 QAM.

15. The method according to claim 6 wherein the plurality of possible constellations includes QPSK, 16 QAM, 32 QAM, 128 QAM or 512 QAM.

* * * * *